(12) United States Patent
Awad

(10) Patent No.: US 11,648,591 B2
(45) Date of Patent: *May 16, 2023

(54) PRESSURE-WASHING APPARATUS

(71) Applicant: Julien Awad, Newcastle, WA (US)

(72) Inventor: Julien Awad, Newcastle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/379,050

(22) Filed: Jul. 19, 2021

(65) Prior Publication Data

US 2021/0339292 A1 Nov. 4, 2021

Related U.S. Application Data

(63) Continuation of application No. 16/024,646, filed on Jun. 29, 2018, now Pat. No. 11,065,651.

(60) Provisional application No. 62/527,892, filed on Jun. 30, 2017.

(51) Int. Cl.
| | |
|---|---|
| *B08B 3/02* | (2006.01) |
| *B08B 3/08* | (2006.01) |
| *B01D 21/00* | (2006.01) |
| *C02F 1/00* | (2023.01) |
| *B08B 3/14* | (2006.01) |

(52) U.S. Cl.
CPC ............ *B08B 3/022* (2013.01); *B08B 3/024* (2013.01); *B01D 21/0012* (2013.01); *B01D 21/0018* (2013.01); *B08B 3/08* (2013.01); *B08B 3/14* (2013.01); *B08B 2203/0241* (2013.01); *C02F 1/004* (2013.01)

(58) Field of Classification Search
CPC ......... B08B 3/022; B08B 3/024; B08B 3/123; B05B 15/68
See application file for complete search history.

(56) References Cited

U.S. PATENT DOCUMENTS

| | | | | | |
|---|---|---|---|---|---|
| 5,133,375 | A | * | 7/1992 | Schinzing | ............ A61G 5/1054 134/123 |
| 6,129,099 | A | * | 10/2000 | Foster | ...................... B08B 1/02 134/131 |
| 2002/0162575 | A1 | * | 11/2002 | Fratello | ..................... B60S 3/04 134/123 |
| 2020/0269290 | A1 | * | 8/2020 | He | .......................... B08B 11/04 |

FOREIGN PATENT DOCUMENTS

EP  1226880 A2 *  7/2002  ............ B08B 3/022

* cited by examiner

*Primary Examiner* — Joseph L. Perrin
*Assistant Examiner* — Kevin G Lee
(74) *Attorney, Agent, or Firm* — Leonid Kisselev

(57) ABSTRACT

The speed, effectiveness, and convenience with which pallets and other objects are cleaned can be increased by using a pressure power-washing apparatus described. The apparatus includes at least one pressure-washer that pumps liquid from a tank into rotary arms within a cleaning chamber, causing the rotation of the arms as the arms eject streams of the liquid pumped under a high pressure from angled nozzles. Conveyors carry an object in need of cleaning into the cleaning chamber, first exposing the object to the streams of the liquid, and then to a drying chamber. Guide rails positioned on the platform guide the object during cleaning, with the shape of one of the guide rails causing the object to fall off following the drying to remove excess liquid left on the object.

20 Claims, 9 Drawing Sheets

<u>19</u>

70

53

91

PRESSURE-WASHING APPARATUS

CROSS-REFERENCE TO RELATED APPLICATION

This non-provisional patent application is a continuation of U.S. Pat. No. 11,065,651, issued Jul. 20, 2021, which claims priority under 35 U.S.C. § 119(e) to U.S. Provisional Patent application, Ser. No. 62/527,892, filed Jun. 30, 2017, the disclosures of which are incorporated by reference.

FIELD

This application relates in general to tools for pressure-washing, and in particular, to a pressure-washing apparatus.

BACKGROUND

A number of industries depend on pallets, flat structures that are often portable by a single person, for transport and storage of goods. For example, such pallets are used to transport and store a variety of foods, and are widely used by restaurants and grocery stores. Likewise, pallets are used in hospitals and other medical organizations for storage of food, sterile goods, and lab supplies. Such pallets are often plastic, though other materials are also be used. As these industries grow, so does the number of pallets needed to support them, with one estimate putting the number of pallets in service in the United States alone to be in the range of two billion.

Consequently to the enormous number of pallets used, replacement of a pallet after a single use is impracticable due to prohibitive cost as well as a negative environmental impact of such a practice. At the same time, pallets used for transport and storage of materials requiring a particularly high level of cleanliness, such as food and medical supplies, may no longer be suitable for that role after a single use due to being too "dirty." Such dirt can be a remainder of the material that was previously stored on the pallet, such as remainders of food or spilled laboratory media. Additionally, bacteria, including pathogenic bacteria, can colonize such remnants, or, even if no visible remnants were left, bacteria present on one type of food, such as raw meat, may be undesirable for another type of food, such as vegetables. Further, if pallets are exposed to the elements either before or after use for an extended period of time, the exposure can promote accumulation of dust and soil on the pallets. Likewise, depending on the material of the pallets, exposure of pallets to moisture, such as during storage, may promote mold growth on the pallets. Thus, before a pallet can be reused, or depending on storage conditions, used for the first time, the pallet has to be cleaned. As the number of pallets that are necessary for a particular operation grows, the pressure to have the necessary pallets grows as well.

Current pallet cleaning techniques lack in speed, effectiveness, and economic efficiency. For example, such pallets can be washed by hand and left to air-dry after being washed. However, such a technique becomes too slow and uneconomical as the number of pallets that need to be cleaned grows, requiring excessive personnel hours to perform and possibly requiring days for a single pallet to dry.

Pressure-washing, also known as power-washing, has also been used to speed up cleaning of pallets. Power-washing involves spraying a liquid pumped at a high pressure at an object in need of cleaning. However, existing power-washing equipment has not proved adequate in addressing the needs described above. For example, U.S. Pat. No. 6,129,099, issued to Foster et al. on Oct. 10, 2000, the disclosure of which is incorporated by reference, discloses a method and apparatus for cleaning articles such as pallets. The apparatus includes a washing chamber. At the entrance to the washing chamber is located a conveyor system, which transports the articles into and through the washing chamber. Adjustable guide rails support the article as the article passes through the chamber. The apparatus includes a high pressure pump supplying fluid at about 1400 psi to spray arms and spray nozzles located in the chamber. In particular, the washing chamber includes fixed or rotating overhead nozzles that are located above the articles being carried by the conveyor belt. The spray arms located within the washing chamber are rotated by motors at a speed of 100-800 rpm and the fluid provided by the pump is ejected from via nozzles as knife-like jet stream spray that impacts the surface of the article being washed at an angle of 10°-45°. The rotating spray arms may be positioned on the sides of the articles being washed as well as above the articles and below the belt conveyors. The fluid used in the washing is collected in a tank and is subsequently pumped to a filter assembly. Blower fans located within a drying chamber adjacent to the washing chamber blow air at the articles to dry them off.

The Foster apparatus has multiple limitations. First, the pressure generated by the fluid pump, 1400 psi, may not be sufficient for effectively cleaning certain kinds of dirt. In addition, as the Foster apparatus uses nozzles located both on the sides, above, and possibly below the article being washed, the large number of nozzles limits the pressure under which the pump can simultaneously provide fluid to the nozzles and increases the amount of fluid that needs to be used in the washing. Furthermore, while apparatus can be transported within the same building using a set of casters on which the apparatus rests or using a forklift, transporting such an apparatus over longer distances in such fashion becomes impracticable. Also, the apparatus receives power from a standard 240v, three phase, electrical connection to function, thus generally being useful only inside a building with an electrical grid sufficient to support all of the elements of the apparatus. The burden on the electrical grid is further increased due to the use of motors to implement the rotation of the spray arms. Finally, the Foster apparatus relies on gravity to filter the used water through the filters, which limits both the speed at which the filtration occurs and the degree of purification of the water, thus limiting the amount of pallets that can be washed before clean fluid needs to be added to the apparatus.

Accordingly, there is a need for a way to quickly and efficiently clean large numbers of objects such as pallets that can be performed in a wide variety of settings.

SUMMARY

The speed, effectiveness, and convenience with which pallets and other objects are cleaned can be increased by using a vehicle-towed portable pressure power-washing apparatus. The apparatus includes a platform that can be towed to a desired destination by a vehicle. On the platform is included at least one pressure-washer that pumps liquid from a tank into rotary arms within a cleaning chamber positioned on the platform, causing the rotation of the arms as the arms eject streams of the liquid pumped under a high pressure from angled nozzles. Belt conveyors carry an object in need of cleaning into two chambers, first exposing the object to the streams of the liquid, and then to air blown into a drying chamber by air blowers positioned on the platform.

Guide rails positioned on the platform support the object during cleaning within the chambers, with the shape of one of the guide rails causing the object to fall off the platform following the drying to remove excess liquid left on the object. Liquid used in the cleaning is collected, filtered, and recirculated for further use using an angled grid within a liquid collector within the chamber and a vacuum filtration unit positioned on the platform. Additionally, pallets with certain configurations can be pre-washed using a portable wand connected to the pressure-washer.

In one embodiment, a pressure-washing apparatus is provided. The pressure-washing apparatus includes a liquid tank; one or more pressure washers connected to the liquid tank, each pressure washer including a motor and a high-pressure pump that is driven by the motor and that pumps liquid from the liquid tank into one or more connections under a high pressure; and a cleaning chamber. The cleaning chamber includes two walls; one or more swivel heads attached to each of the walls, each of the swivel heads comprising an end connected to one of the connections and an opposite end including a rotatable hollow shaft; one rotary arm mounted on each of the swivel heads, each of the arms including a hollow rotatable bar set onto the rotatable hollow shaft, each of the hollow bars including a substantially straight central portion and a bent portion formed on each of the ends of the substantially straight central portion, wherein the bent portions are offset from the substantially straight central portion with respect to two axis, each of the arms further including a spray nozzle mounted upon an end of each of the bent portions of the hollow bar and angled relative to the substantially straight central portion in the two axis, the angled spray nozzles pointing into different directions, wherein the pump pushes the liquid through the connection connected to that swivel head through the hollow bar of that arm, and through the angled spray nozzles of that arm, causing an ejection of the liquid from the angled spray nozzles of that arm in a plurality of streams directed at least a portion of time at an object within the cleaning chamber, and wherein the ejection of the streams from the angled spray nozzles causes a rotation of that arm and the rotatable hollow shaft upon which the hollow rotatable bar of that arm is set; and a plurality of conveyors that carry the object in, through, and out of the cleaning chamber, the object having a plurality of surfaces, the surfaces including a bottom surface, a top surface, and side surfaces, wherein two of the plurality of the conveyors are separated by a gap, wherein the liquid ejected from one or more of the angled spray nozzles hits at least a portion of the bottom surface of the object when the object passes over the gap and wherein the liquid ejected from one or more of the angled spray nozzles hits at least a portion of each of the remaining ones of the plurality of surfaces of the object as the object is carried through the cleaning chamber by one or more of the plurality of conveyors.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

While the apparatus described below references cleaning of pallets, the apparatus can also be used for cleaning of other objects. Further, pallets of a configuration different from the one shown in FIGS. 2A-2B can also be washed using the apparatus. While the objects being cleaned, such as pallets, can be made of plastic, objects made of other materials can also be cleaned using the apparatus.

Figure 1:
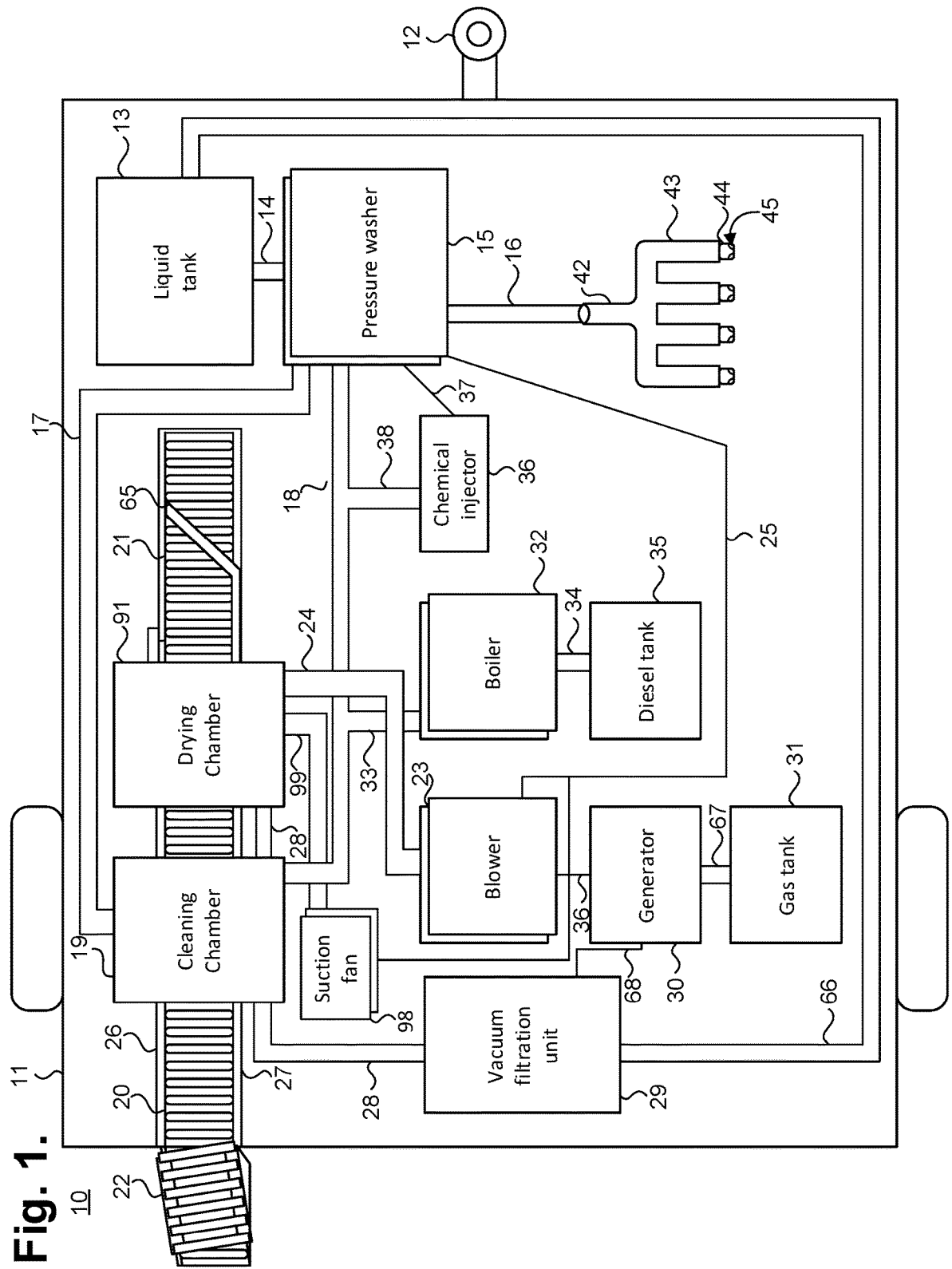
FIG. 1 is a diagram showing a vehicle-towed pressure-washing apparatus in accordance with one embodiment.

Portability of a cleaning apparatus can be increased by making the apparatus towable by a vehicle. FIG. 1 is a diagram showing a vehicle-towed pressure-washing apparatus 10 in accordance with one embodiment. The apparatus includes a portable platform 11 that includes a vehicle coupling 12 and can be towed by a vehicle. The vehicle coupling 12 can be a trailer tongue that can attach to a trailer hitch on a vehicle, though other types of vehicle couplings 12 are also possible. In one embodiment, the vehicle can be an automobile, though other kinds of vehicles are also possible. In one embodiment, the platform 11 is a trailer on wheels, though other kinds of portable platforms suitable for transportation over a variety of terrains are possible. A liquid tank 13 is located on the platform. In one embodiment, the volume of the tank 13 can be 400 gallons, though other tank sizes are also possible. The liquid within the liquid tank can be water, though other kinds of liquids, including various mixtures and solutions, are possible. The liquid tank 13 is connected by a connection 14 to at least one pressure washer 15 also located on the platform 11. The pressure washer 15 includes a motor and a high-pressure pump that is driven by the motor. The pressure washer 15 further includes an unloader valve for regulating the liquid flow and pressure within the pressure washer. The motor can be a gasoline-powered motor, though other kinds of motors are also possible. In addition to driving the pump, the motor can generate electrical power that can be used to power other components of the apparatus 10, such as the belt conveyors 20-22. Other components in the pressure washer 15 are possible. The pump pumps liquid from the liquid tank 13 via a connection 14 into a plurality of connections 16, 17, 18 under a high pressure. In one embodiment, a single pressure washer 15 is present on the platform 11. In a further embodiment, multiple pressure washers 15 can be present on the platform 11. The connections 16-18, as well as other connections described below through which liquid and gases pass, can be flexible connections such as hoses, or rigid connections such as pipes, though other kinds of connections are also possible.

The connections 17, 18 connect the pressure washer 15 to a cleaning chamber 19 where objects that needs to be cleaned, such as pallets, undergo cleaning. As further described below with reference to FIG. 3, the chamber 19 includes two walls that are substantially parallel to each other. On each of the walls are mounted two rotatory arms, each of the arms further including two spray nozzles mounted on the ends of that arm. As further described below, the pressure washer 15 pumps the liquid under a high pressure through the spray nozzles of the arms in a plurality of streams directed at an object being washed. The ejection of the liquid streams from the nozzles in turn causes a rotation of the spray arms, allowing the spray arms to spray the liquid at the object from multiple positions. In one embodiment, the liquid is ejected from each of the nozzles at the rate of two gallons per minute under a pressure of 4,000 psi. In a further embodiment, other numbers are possible.

The apparatus 10 further includes one or more belt conveyors 20-22, which can be powered by the motor of the pressure washer 15, though other sources of power are possible. In particular, the belt conveyors 20 and 21 are located partially within the cleaning chamber 19, with the belt conveyor 20 bringing the objects that need to be cleaned into the cleaning chamber 19 and the belt conveyor 21 bringing the objects out of the chamber 19 after the object has been cleaned. The object can be initially placed on the belt conveyor 20 to be brought into the cleaning chamber 19, such as by the personnel overseeing the cleaning. Alternatively, the apparatus 10 can include an additional belt conveyor 22 at least a part of which is not located on the platform 11, but which is proximate enough to the belt conveyor 20 to carry the object being cleaned to the belt conveyor 20, thus allowing the object to be transported into the chamber 19. Thus, at least a part of the belt conveyor 22 could be attached to the platform 11 and hanging from the platform 11. Alternatively, the belt conveyor 22 can be physically detached from the platform 11, but leaned against the platform 11 during the operation of the apparatus 10. Other ways in which the belt conveyor 22 can pass the object to the belt conveyor 20 are possible. The belt conveyors 20-22 can each include a separate motor; in a further embodiment, at least some of the belt conveyors 20-22 can include a shared motor. The motors of the belt conveyors can have independent power sources, be powered via an electrical connection (not shown) from the pressure washer 15, or be powered by the generator 30 described below via an electrical connections (not shown).

In addition to the cleaning chamber 19, the apparatus further includes a drying chamber 91, into which the conveyor 21 carries the object being cleaned after the object is cleaned in the cleaning chamber 19. The apparatus further 10 includes at least one air blower 23, which can blow air via one or more connections 24 at the object in the drying chamber 91 by removing at least some of the liquid left after using the spray arms, as further described below with reference to FIGS. 8 and 9. While in FIG. 1, only one connection 24 is shown connecting to one side of the chamber 91, in a further embodiment, multiple connections 24 can connect to multiple sides of the chamber 91. The blower 23 can include at least one fan that blows air through the connections 24. The air blower 23 can also include an air compressor that generates the streams of air being blown. Still other kinds of air blowers 23 are possible. In addition, at least one suction fan 98 is included on the platform 11 and is connected to the drying chamber 91 via a connection 99. The suction fan 99 creates a partial vacuum to suck up moisture from the drying chamber 91, such as by including an air pump (such as a centrifugal fan), though other ways to create the partial vacuum. The at least one suction fan 98 can be powered by the pressure washer 15, through the connection 25 or through a connection that is wholly separate from the connection powering the at least one blower 23. Other ways to power the suction fan 98 are possible.

The chamber 91 can further include a window (not shown), which can be included on top of the chamber 91 to provide the heated air an additional escape from the chamber 19. The blower 23 can be powered by an additional electric power generator 30 can be located on the platform 11. The generator 30 can be a gasoline generator and be connected via a connection 67 to a gasoline tank 31, though other kinds of generators 30 are also possible. In a further embodiment, other sources of power for the blower 23 are possible, such as the motor of the power washer 15.

While the use of the air blower 23 removes a significant amount of the liquid from the object being cleaned, some liquid tends to remain on the object even after the air drying. While the amount of moisture removed could be increased by increasing the time the object spends being air dried, such an increase would lead to a slowing of the rate at which the objects are washed. To increase the rate at which the cleaned objects dry without negatively affecting the cleaning speed, the apparatus 11 includes at least two guide rails 26, 27. As further described below with reference to FIG. 3, the guide rails 26, 27 support the object such as a pallet in the position for cleaning while the object travels on the belt conveyors 20, 21. Whereas the portions of the guide rails 26, 27 that guide the object before the object enters the cleaning chamber 19 and after the object enters the cleaning chamber are substantially parallel with the walls of the cleaning chamber 19 and the drying chamber 91, a portion of one of the guide rails 26, 27 traverses over a portion 65 of the belt conveyor 21. When the object such as a pallet being carried by the belt conveyor 21 is pushed against the diagonal portion 65 of the guide rail 26, 27, the object tips over and falls from the belt conveyor 21. The impact of the fall shakes additional liquid from the object, minimizing the time that the object needs to be dried afterwards. While FIG. 1 shows the rail 27 as having the traverse portion 65, in a further embodiment the rail 26 can be the rail with the traverse portion 65. Further, while only one of the rails 26, 27 is shown as extending from the side of the chamber 91 from which the cleaned object exits, in a further embodiment, the rail 26, 27 that does not have the traverse portion 65 can also extend from the chamber to maintain the object in the proper position on the belt conveyor 21 until the object reaches the diagonal portion 65 of the guide rail. In addition, while only one guide rail 26 and one guide rail 27 is visible in FIGS. 1, 3, and 8, multiple levels of guide rails 26, 27 can be vertically stacked, as shown with reference to FIGS. 4 and 9.

The apparatus 10 does not require a constant replenishment of the liquid in the liquid tank 13. As further described below with reference to FIG. 3, the liquid used in the cleaning of the object inside the cleaning chamber 19 accumulates inside a liquid collector included in the chamber 19, which includes an enclosure located beneath the belt conveyors. The enclosure is in turn connected via a connection 28 to a vacuum filtration unit 29 that uses vacuum to draw the liquid from the liquid collector in the chamber 19 through one or more filters (not shown) located within the unit. Once filtered, the vacuum filtration unit 19 pumps the filtered liquid into the liquid tank 13 via a connection 66, thus replenishing the liquid supply available for cleaning additional objects. While the amount of liquid removed from the object in the drying chamber 91 is significantly less the amount of liquid that is sprayed in the cleaning chamber 19, the drying chamber 91 can also include the enclosure connected to the vacuum filtration unit in the same way as the cleaning chamber 19, as further described below with reference to FIG. 9. The vacuum filtration can be powered by the generator 30 via an electrical connection 68; alternatively, the vacuum filtration unit can receive power from another source, such as by being electrically connected to the pressure washer 15 (electrical connection not shown).

The liquid being pumped by the pressure washer 15 can be manipulated before being expelled through the spray nozzles. For example, the liquid can be heated up as the liquid passes through the connections 17, 18 from the pressure washer 15 into the cleaning chamber 19. Thus, at least one boiler 32 can be located on the platform 11 and connected via a connection 33 to one or more of the connections 17, 18, and can heat up the liquid being pumped into the cleaning chamber 19 to increase the efficiency of the water. While in FIG. 1, the connection 33 interfaces only to one of the connections 16, 17, 18 connection 18, in a further embodiment, the connection 33 could heat up the liquid pumped over two or all of the connections 16, 17, and 18. The boiler 33 fan be powered by diesel and can be connected via a connection 34 to a diesel tank 35 from which the diesel is supplied, though other kinds of liquid heaters 33 are possible. Further, a chemical injector 36, which can be powered by the motor of the pressure washer 15 via an electrical connection 37, can be located on the platform 11. In a further embodiment, the injector 36 can be powered by the generator 30 via an electrical connection (not shown). The injector 37 can inject via a connection 38 pre-loaded chemicals, such as soap, antibacterial and antifungal chemicals, or other cleaning chemicals, into the liquid being pumped into the cleaning chamber 19 via connections 17, 18, providing the liquid additional desired properties and improving the cleaning of objects such as pallets.

Figure 2A:
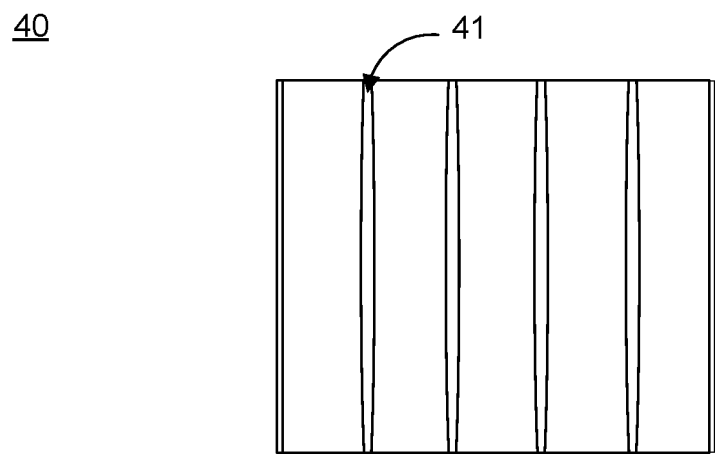
FIGS. 2A-2B show, by way of example, pallets of a particular configuration that may require pre-washing.
Figure 2B:
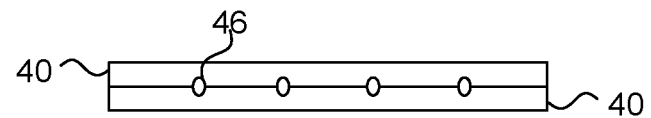

While the cleaning chamber 19 and the drying chamber 91 provide an effective and efficient way of cleaning the pallets, some pallets may be of a shape that complicates cleaning of all external surfaces of such pallet. FIGS. 2A-2B show, by way of example, pallets 40 of a particular configuration that may require pre-washing. As shown in FIG. 2A, a pallet 40 may include grooves 41 along the sides, with some of the groove surface being harder to reach with the liquid sprayed from the spray arms. The surfaces of the grooves 41 can be pre-washed using a portable wand 42 that is connected to the pressure washer 15 via a flexible connection 16. The wand 42 includes multiple hollow 43 rods through which travels the liquid pumped by the pressure washer 15. At the end of each of the rods is set a rotatable nozzle 44. Each nozzle 44 includes at least two openings 45 through which the liquid pumped by the pressure washer 15 is sprayed. A rotatable nozzle 44 is set on each of the rods 43, and the streams of the pumped liquid exiting from the openings urges a rotation of the nozzles. For example, as further described below, multiple pallets can be stacked on top of each other in a way that the grooves on the adjacent pallets 41 are aligned, forming a passage 46 through which the rods 43 of the wand 42 can be inserted, as can be seen with reference to FIG. 2B. The number of the rods 43 on each wand be customized for the type of pallet 41 being cleaned and can match the number of passages 46 formed by the grooves 41 when a pallet 40 is stacked on top of another pallet 40. When the rods 43 are inserted inside the passages, the pressure of the liquid streams ejected from the openings of each of the nozzles causes each of the nozzles to rotate, with the rotation increasing the area cleaned by the spraying of the liquid. Other configurations of the pallets could include slots instead of grooves 41, with the wand 42 being similarly capable of washing the slots aligned when the pallets 40 are stacked on top of each other.

While FIG. 1 shows the pressure washer 15 being connected to a single wand 42, in a further embodiment, multiple wands 42 can be simultaneously present. Thus, the wands 42 can be simultaneously used. For example, if four or more pallets 41 are stacked on top of each other, the rods 43 of at least two wands can be simultaneously inserted into the at least two rows of passages 46 formed by the stacked pallets, allowing to clean the grooves of multiple sets of pallets 40 simultaneously. When multiple wands 42 are thus used simultaneously, the wands 42 can be attached to a stand, portable or stationary, thus not requiring constant human oversight of the cleaning.

In one embodiment, the machinery described above that is located on the platform 11 can be turned off and on manually and run independently of each other. In a further embodiment, the machinery can be controlled via electrical connections by a micro-processor capable of executing computer-executable code. The micro-processor could be programmed to execute particular programmed routines upon receiving a user command during which the pallets are exposed to particular cycles of being sprayed with the liquid and dried under the fan.

Figure 3:
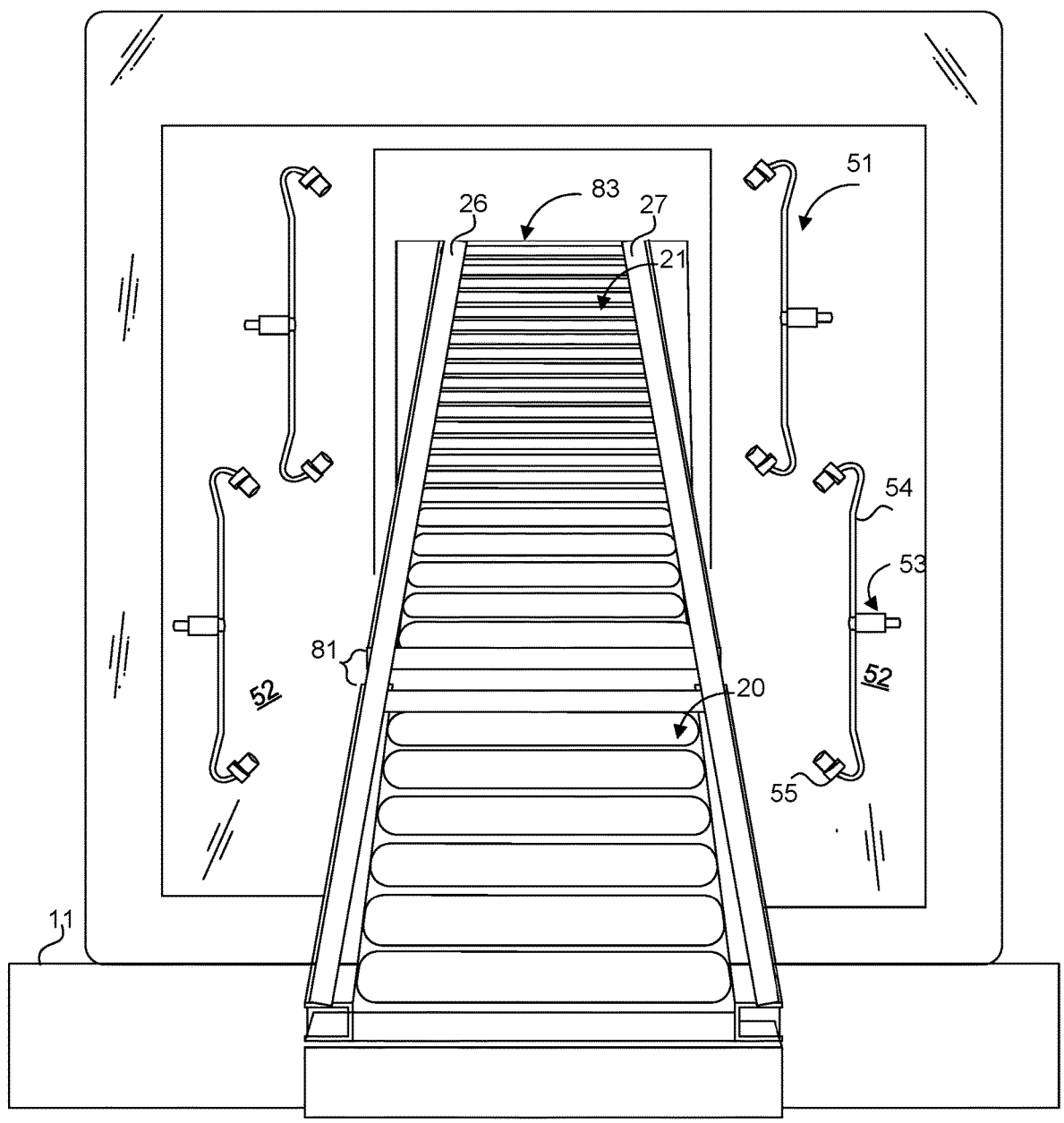
FIG. 3 is a diagram showing a portion of the inside of the cleaning chamber in accordance with one embodiment.

As mentioned above, the majority of the washing and drying of the pallets takes place within the cleaning chamber. FIG. 3 is a diagram showing a portion of the inside of the cleaning chamber 19 in accordance with one embodiment. For the sake of clarity, the entrance to the chamber 19 is shown uncovered. In a further embodiment, the entrance could be at least partially covered to prevent excess liquid from spilling out from the chamber 19. Further, for the sake of clarity only a portion of the platform 11 is shown and the optional belt conveyor 22 is not shown.

Figure 7:
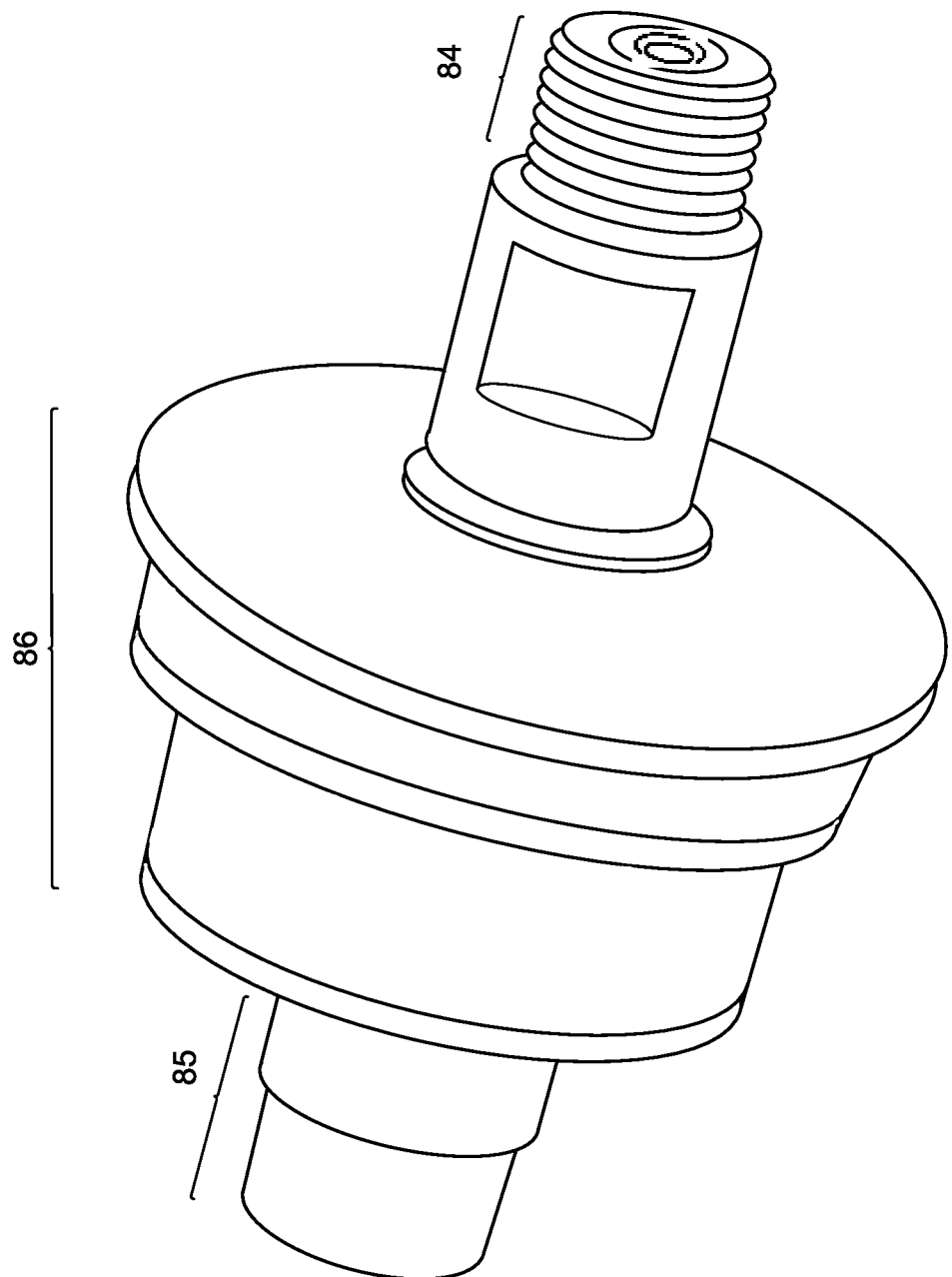
FIG. 7 is a diagram showing a swivel head in accordance with one embodiment.

On each of the walls 52 of the cleaning chamber 19 are mounted two rotatory arms 51. Each of the arms 51 is mounted to a swivel head 53 that is attached to the wall 52. Each arm 51 includes a hollow bar 54 at each end of which is set a spray nozzle 55. One side of the bar 54 includes a threaded opening (not shown) that is fixedly set onto a rotatable, threaded end of a swivel head 53. The rotatable portion of the swivel head 53 includes a hollow threaded shaft 84, shown with reference to FIG. 7, on which the hollow bar 54 is set and which freely rotates with the bar 54 in relation to the remainder of the swivel head 53. The opposite end of the swivel head 53 includes a stationary hollow rod 85 that is connected to one of the connections 17, 18, leading from the pressure washer 15, allowing fluid pumped by the pressure washer 15 to enter the swivel head 53. The hollow rod 85 and the rotatable shaft 84 are also connected via at least one passage in the body 86 of the swivel head 53, allowing the fluid pumped by the pressure washer into the hollow rod to pass through the body 86 of the swivel head and enter into the rotatable shaft 84. Through the rotatable shaft 84 the liquid can flow into the hollow bar 54, eventually reaching the nozzles 55 and being ejected from the nozzles 55 under high pressure (such as 4,000 psi, though other pressure is also possible). One or more O-rings can be positioned on the threaded rotatable shaft 84 to promote a sealed coupling of the hollow bar 54 to the swivel head 53 and to prevent the fluid from leaking. In one embodiment, the swivel head 53 can be a DYCI/DYDI swivel head manufactured by Mosmatic AG of Necker, Switzerland, though other kinds of swivel heads 53 are also possible. In a further embodiment, additional nozzles could be positioned on portions of the walls, with the liquid supplied by the pressure washer being sprayed from those nozzles.

While the coupling of the hollow bar 54 and the swivel head 53 is described above via the threads on the rotatable shaft 84 and the hollow bar 54, other ways for the coupling to be done are possible.

The connections 17, 18 swivel head 53, the hollow bar 54, and the nozzles 55 form a continuous conduit through which the liquid is pumped by the pressure washer 15 under a high pressure, streams of the liquid exiting from the nozzles 55.

Figure 6:
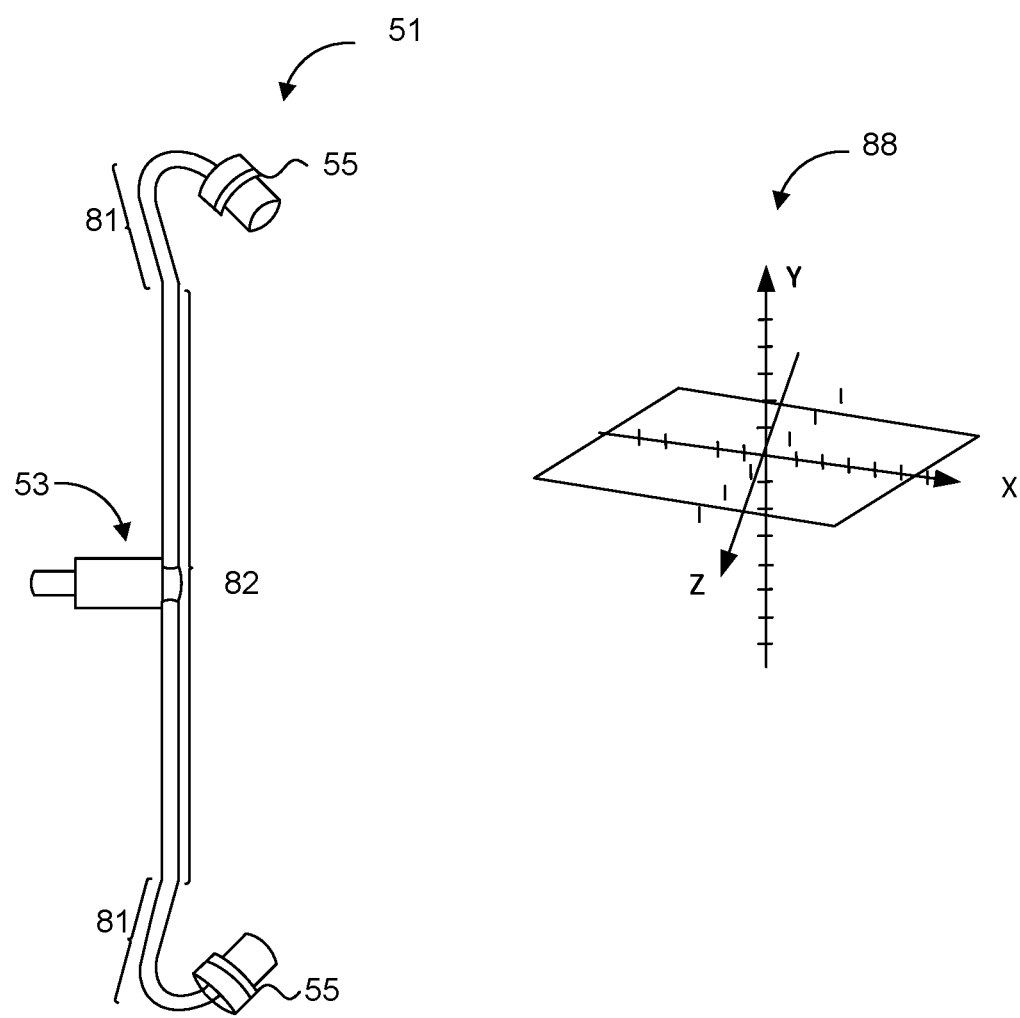
FIG. 6 is a diagram showing one of the arms set of the apparatus set on a swivel head in accordance with one embodiment.

FIG. 6 is a diagram showing one of the arms 51 of the apparatus 10 in accordance with one embodiment. As can be seen with reference to FIG. 6, the hollow bar 54 includes portions 81 are bent to the straight portion 82 of the hollow bar 54. By being set on the bent portions 81, the nozzles 55 are at an angle relative to the straight portion 82 of the bar 54 in multiple dimensions. For purposes of clarity, a three-dimensional axis grid 88 is shown next to the arm 51. The grid 88 includes a y-axis, along which coordinates along a vertical plane are measured; an x-axis, along which coordinates along a horizontal plane are measured; and a z-axis, along which depth is measured. The nozzles 55 are angled with respect to the straight portion 82 of the bar 54 along two planes. Thus, with the position of the arm 51 shown with reference to FIG. 6, the nozzles are at an angle along the z-axis relative to the straight portion 81 of the bar 54. As can be seen with reference to FIG. 6, the nozzles are pointed into opposing directions along the z-axis. In one embodiment, each nozzle 55 deviates 15°-20° (in a direction opposite to the other nozzle) from the straight portion 82 of the bar 54 along the z-axis, though other degrees of deviation are possible. Further, the nozzles 55 are also at an angle with respect to the straight portion 82 of the bar 54 along the y-axis, pointed towards each other along the y-axis. In one embodiment, the nozzles are set at an angle of 35-50 degree along the y-axis with respect to the straight portion 82 of the bar 54, though other angles are possible. While in one embodiment, the angles by which the nozzles 55 differ from the straight portion 82 of the bar 54 are the same for both nozzles 55 (even though the nozzles are not pointed in the same direction), in a further embodiment the angles can be different. The description of the position of the nozzles 55 above is in reference to the orientation of the arm 51 shown in FIG. 6, and the directions in which the nozzles 55 point would change along with a change in the orientation of the arm 51.

The expulsion of the stream of the liquid from the angled nozzles 55 at the high pressure causes the rotational movement of the bars 54 (and consequently of the nozzles and of the rotatable shaft of the swivel head 53) regardless of whether the stream of water hits the pallet 41 due to the water streams being expelled from the nozzles in different directions, thus allowing to avoid having a separate motor to rotate the arms 51. In one embodiment, the speed of the rotation can be between 1500 and 2000 rpm, though other rotation speeds are also possible. Thus, the apparatus does not require use of additional motors for rotation of the arms 51, saving power.

The angling of the nozzles 55 allows to cover multiple surfaces of the object being washed, including the top surface, and thus not requiring an installation of additional nozzles on top of the object. In addition, the positioning of the belt conveyors allows the washing of the bottom surface of the object. As mentioned above, portions of the belt conveyors 20 and 21 are included within the chamber 19.

The belt conveyors 20 and 21 do not join into a continuous belt conveyor, but rather a gap 81 exists between the conveyors 20, 21. The gap 81 is small enough for an object such as a pallet 40 to pass over the gap 81 and transition from being carried by the belt conveyor 20 to being carried by the belt conveyor 21. When passing over the gap 81, the surface of the pallet 40 that is pressed against the belt conveyors 20, 21 at other times is exposed to the liquid stream being ejected from the angled nozzles 55 when the nozzles 55 are located below the level of that surface during the rotation of the rotary arms 51. Due to the angled, spray nozzles 55 being able to spray liquid at all surfaces of the object being washed, including the top and the bottom surfaces, apparatus does not need to include nozzles located above and below the object. By reducing the number of nozzles needed to wash all sides of the object, the pressure of liquid delivered through the nozzles and the speed of the rotation of the nozzles can be increased, in turn increasing the effectiveness of the cleaning. In addition, by reducing the number of nozzles needed for the cleaning, the volume of the water pumped through each of the nozzles can be increased, resulting in a greater cleaning action.

The guide rails 26, 27 help support the pallet 40 in place while the pallet 40 moves on the conveyor 20 and 21. The guide rails 26, 27 can be attached to the walls of the chamber 19 and the chamber 91 or to the belt conveyors. In one embodiment, the guide rails 26, 27 can be fixedly attached to the walls of the chamber 19 and the chamber 91 or to a stationary portion of the belt conveyors 20, 21. In a further embodiment, the position of the rails 26, 27 can be adjustable. In one embodiment, the portions of the guide rails 26, 27 within the chambers 19 and 91 are diagonally placed in relation to the pallet 40. Thus, as the pallet 40 is carried by the belt conveyors 20, 21 along the guide rails 26, 27 towards the exit 83 from the chamber 19, the portions of the pallet 40 that are shielded from the liquid streams ejected from the nozzles 55 are not the same when the pallet is at different points of the conveyor belts due to the diagonal rails. In a further embodiment, the orientation of the guide rails 26, 27 in the chamber 91 can differ from the orientation in the chamber 19. In a still further embodiment, other orientations of the rails 26, 27 are possible.

Figure 4:
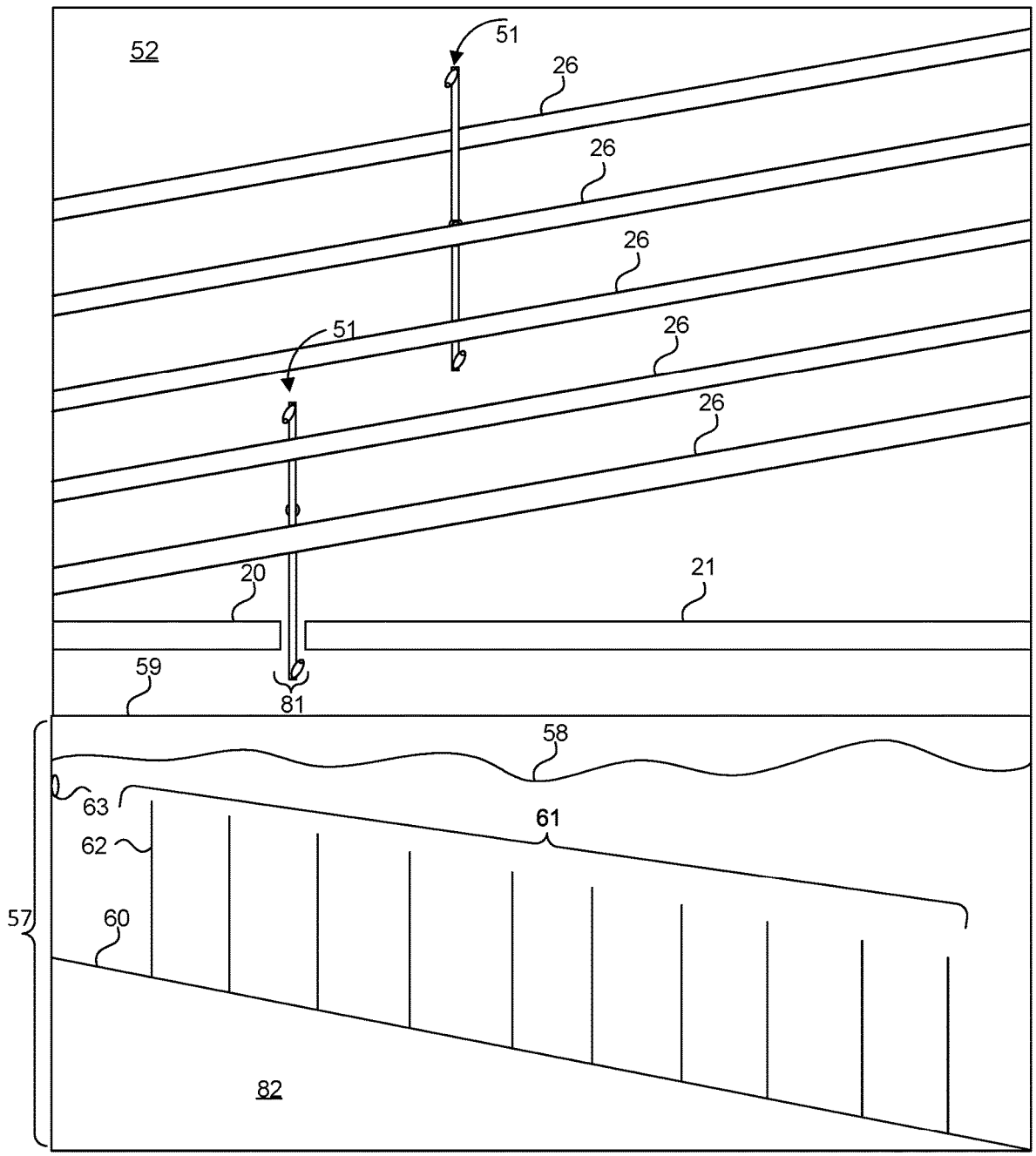
FIG. 4 is a diagram showing a cross-section view of the inside of the chamber in accordance with one embodiment.

To increase the area covered by the liquid streams ejected by the rotary arms 51, the two rotary arms 51 on each of the walls of the chamber 19 are not mounted on the same horizontal plane. FIG. 4 is a diagram showing a cross-section view of the inside of the chamber 19 in accordance with one embodiment. As can be seen with reference to FIG. 4, one of the rotary arms 51 is set lower than the rotary arms 51 on the same wall. In a further embodiment, the heights at which the arms 51 are set can be different from the heights shown in FIG. 4. Further, as mentioned above, the chamber 19 includes a liquid collector 57 located below the belt conveyors 20, 21 and into which most of the liquid 58 ejected from the rotary arms 50 collects. The collector 57 includes an enclosure 59 into which the liquid 58 collects. The collector 57 further includes a floor 60 tilted at an angle. As shown in FIG. 4, the space 82 between the tilted floor 60 and the bottom of the enclosure 59 can either be empty, or filled with some material.

An angled grid 61 is positioned on the floor 60, the grid 61 being made of multiple sheets 62. Each of the sheets 62 spans from one end of the enclosure 59 to another, preventing the liquid 58 from bypassing the sheet 62 except by going above the sheet 62. In one embodiment, the sheets 62 can be metal sheets fixedly attached to the floor 60, though other kinds of sheets are possible. Above the level of the sheets 62, a passage 63 is formed in the enclosure 57 that connects the enclosure 57 to the connection 28 and to the vacuum filtration unit 29. The vacuum created by the vacuum filtration unit 29 draws the liquid 58 from the unit 29 into the connection 28. Due to the angling of the floor 60, the top of the sheets located closer to the passage 63 extend higher than the tops of the sheets 62 located further from the passage.

The angled grid 61 helps to prevent undissolved dirt washed off the pallet 40 from entering the passage 63 leading to the filtration unit 29, and thus helps to prevent the dirt from contaminating the vacuum filtration unit 29, extending the unit's 29 longevity. In particular, when the liquid 58 is drawn towards the passage 63, the movement of the undissolved dirt is hindered by the sheets, promoting the sedimentation of the dirt either on the sheets 62 or in the area between the sheets 62. Due to the angling of the floor 60, the top of the sheets located closer to the passage 63 extend higher than the tops of the sheets 62 located further from the passage 63, making progressively harder for the dirt to get over the sheets 62 that are closer to the passage 63. In addition, as the passage 63 is located above the level of the floor 60, the undissolved dirt that travels past the highest of the sheets 63 has an increased chance of settling on the bottom on the floor 60 before entering the passage, further reducing the amount of the dirt entering the passage 63.

Figure 8:
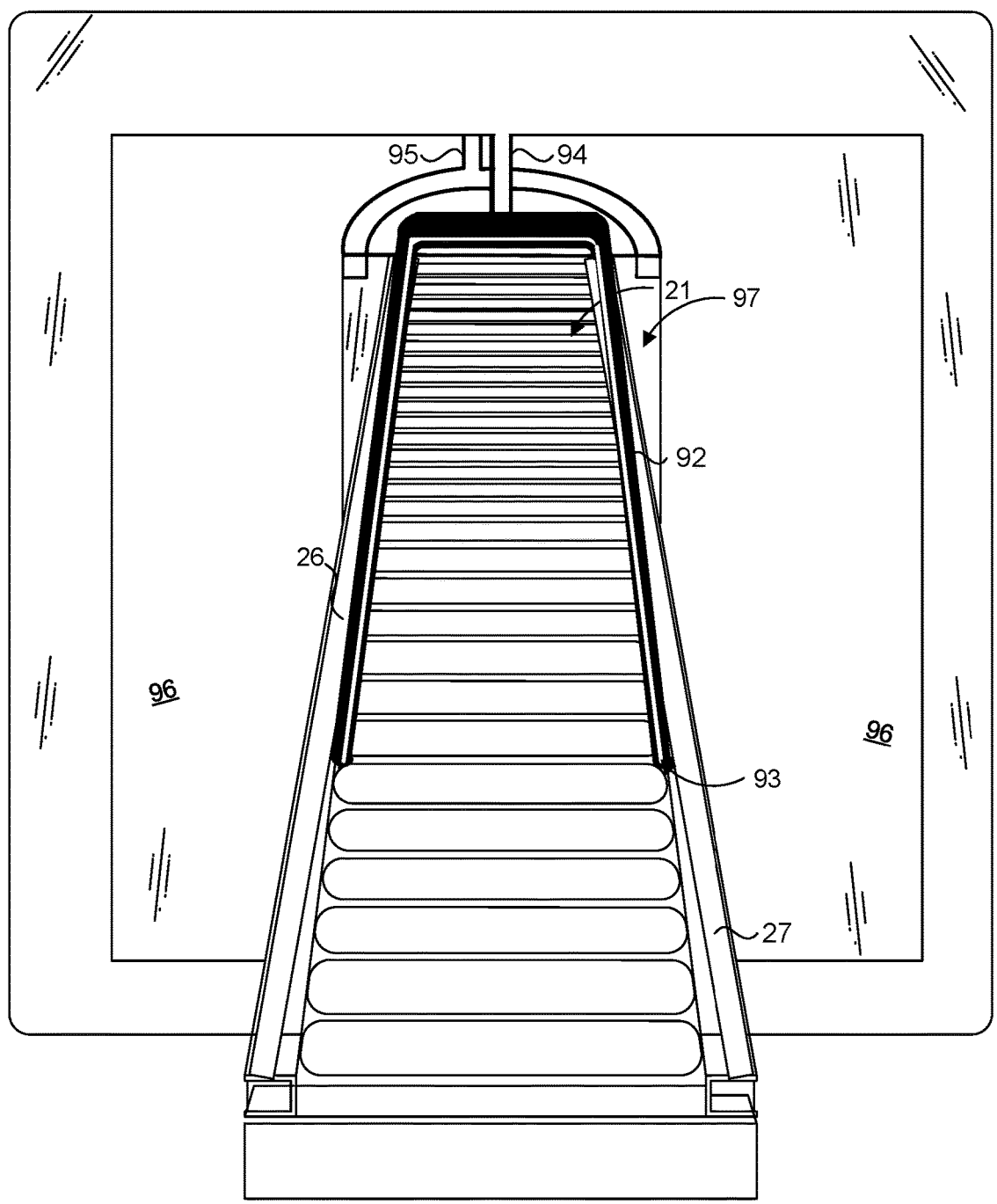
FIG. 8 is a diagram showing a portion of the inside of the drying chamber in accordance with one embodiment.

Once an object has been washed in the cleaning chamber, the conveyor 21 carries the object into the drying chamber 91. FIG. 8 is a diagram showing a portion of the inside of the drying chamber 91 in accordance with one embodiment. For the sake of clarity, the entrance to the chamber 91 is shown uncovered. In a further embodiment, the entrance could be at least partially covered to prevent liquid from spilling out from the chamber 91. Further, for the sake of clarity only a portion of the platform 11 is shown and connections, such as connections 24, 99, to the outside of the chamber are not shown.

The drying chamber 91 includes a pipe 92 that is connected via a connection 94 to one of the connections 24 to one or more of the blowers 23 and is positioned between the guide rails 26, 27 on the walls 96 of the chamber 91. The pipe 92 further includes a slit 93 through which the blown by the one or more blowers 23 via the pipe 92 and the connection 24 exits. The slit 93 is positioned on the surface of the pipe 92 facing the object being dried as the object is carried by the conveyor 21 through the chamber. The pipe 92 is positioned diagonally above the conveyor belt 21 so that the air from the slit 93 is blown at different portions of the object as the object is carried through the chamber 91 by the conveyor belt 21. The pipe 92 is attached to a connector pipe 94, which both physically secures the pipe 93 in place, and connects the pipe 92 to the connection 24 through which air is supplied by the at least one blower 23 into the pipe.

The chamber 91 further includes a connection 95, which interfaces the chamber to the connection 99 and consequently, the at least one suction fan 99. Through the connection 95, at least a portion of the moisture that is in the air within the drying chamber 91 is suctioned off by the at least one suction fan 99, promoting drying off of the object in the chamber. In one embodiment, the moisture can be suctioned off at the same time as air is blown through the slit 93 of the pipe 93. In a further embodiment, the blowing of air through the slit 93 and the suctioning off of the moisture is conducted at separate times. While the connection 95 is shown with reference to FIG. 8 to be located at the exit 97 from the chamber 91, in a further embodiment, other positions for the connection 95 is possible.

Figure 9:
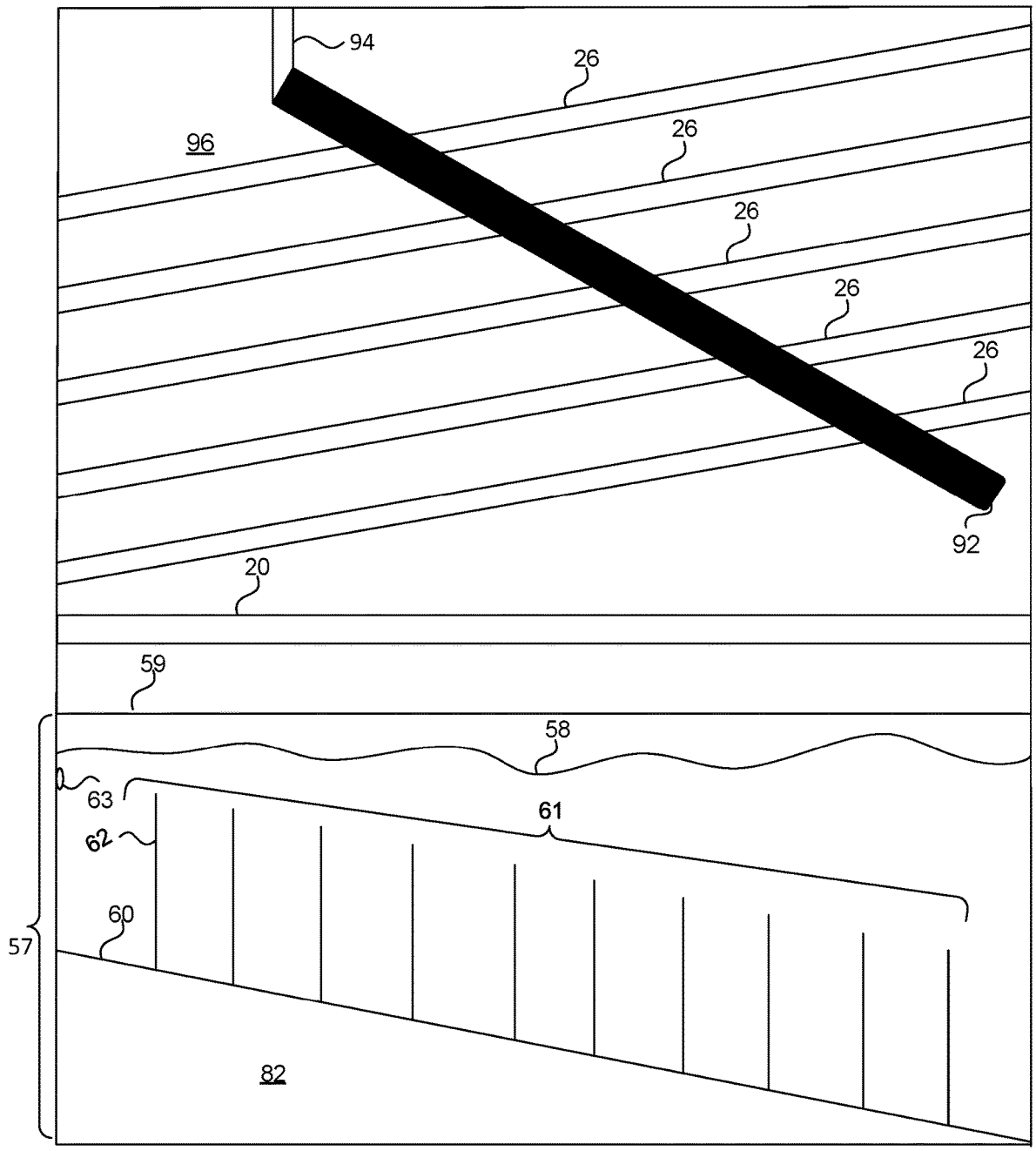
FIG. 9 is a diagram showing a cross-section view of the inside of the chamber in accordance with one embodiment.

The positioning of the pipe 92 within the chamber 91 maximizes the exposure of the object being dried to the air being blown from the slit 93. FIG. 9 is a diagram showing a cross-section view of the inside of the chamber 91 in accordance with one embodiment. As can be seen with reference to FIG. 9, the pipe 92 is located of between the guide rails 26 and the guide rails 27 (not shown in FIG. 9). Further, as mentioned above, the chamber 91 can include a liquid collector 57 located below the belt conveyor 21 and into which most of the liquid 58 coming off from the object being dried collects and is removed from the chamber 91 via vacuum filtration, as further described above with reference to FIG. 4. In a further embodiment, the collector 57 could be absent from the chamber 91 and any liquid removed from the object being dried could land on a horizontal floor of the chamber. While the connection 28 to the vacuum filtration unit 29 is shown as passing through the cleaning chamber 19, in a further embodiment, the connection 28 of the drying chamber 91 to the vacuum filtration unit 19 could bypass the cleaning chamber.

Figure 5:
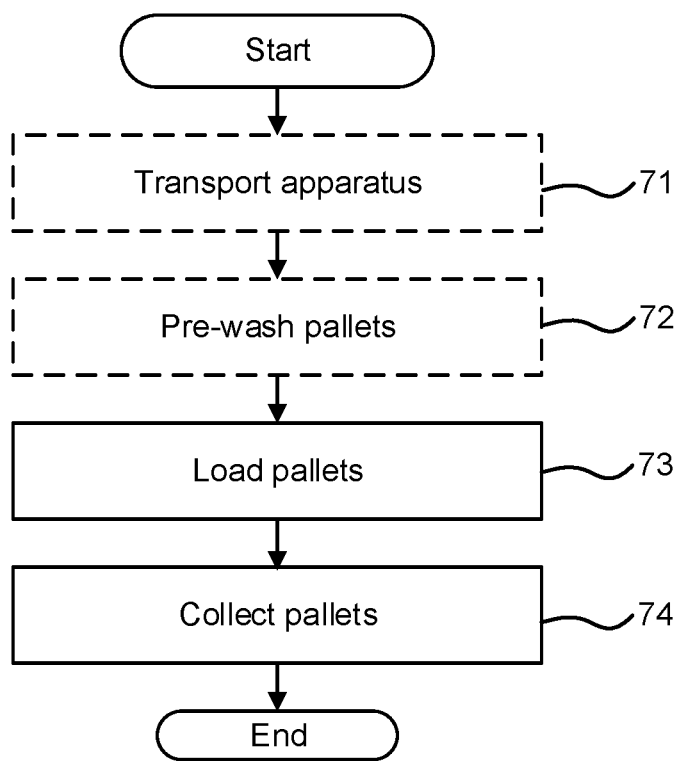
FIG. 5 is a flow-diagram showing a method for use of the vehicle-towed portable power-washing apparatus of FIG. 1 in accordance with one embodiment.

The use of the apparatus 10 allows to perform a quick and efficient cleaning of pallets at any place that is accessible to a vehicle. FIG. 5 is a flow-diagram showing a method 70 for use of the vehicle-towed portable power-washing apparatus 10 of FIG. 1 in accordance with one embodiment. Optionally, if the apparatus 10 is already not in a required location, the apparatus 10 is towed by a vehicle to the location where the cleaning needs to be performed, such as to a site of a restaurant, hospital, or another establishment in need of cleaned pallets (step 71). Also optionally, depending on pallet 40 configuration, pallets are stacked on top of each other so that the grooves 41 between the adjacent pallets 40 are aligned, and the passages 46 formed by the grooves of the pallets are washed by insertion of rods 43 of the wands 42 into the passages 46, as further described above with reference to FIG. 1 (step 72). Following the optional washing of the grooves, the objects being washed, such as pallets 40 are loaded onto either belt conveyor 20 (or belt conveyor 22 if the belt 22 is present), with the belt conveyors 20, 22 bringing the pallets 40 into the cleaning chamber 19, where the pallets 40 are washed and dried as described above, and the belt conveyor 21 bringing the pallets 40 out of the chamber 19 until the pallet fall off due to the impact with the diagonal portion of one of the rails 26, 27 (step 73). In one embodiment, the objects can be loaded onto the belt conveyor 20, 22 manually by an operator of the apparatus 10. In a further embodiment, the objects can be loaded using the automatic pallet feeder (not shown). The objects dropped from the apparatus 10 are then collected, either for reuse or for additional drying (step 74), ending the method 70. In one embodiment, the collection can be done manually by the operator; in a further embodiment, the collection can be done using machinery such an automatic pallet stacker/dispenser.

While the invention has been particularly shown and described as referenced to the embodiments thereof, those skilled in the art will understand that the foregoing and other changes in form and detail may be made therein without departing from the spirit and scope of the invention.

What is claimed is:

1. A pressure-washing apparatus, comprising:
   a liquid tank;
   one or more pressure washers connected to the liquid tank, each pressure washer comprising a motor and a high-pressure pump that is driven by the motor and that pumps liquid from the liquid tank into one or more connections under a high pressure;

a cleaning chamber, comprising:
two walls;
one or more swivel heads attached to each of the walls, each of the swivel heads comprising an end connected to one of the connections and an opposite end comprising a rotatable hollow shaft;
one rotary arm mounted on each of the swivel heads, each of the arms comprising a hollow rotatable bar set onto the rotatable hollow shaft, each of the hollow bars comprising a substantially straight central portion and a bent portion formed on each of the ends of the substantially straight central portion, wherein the bent portions are offset from the substantially straight central portion with respect to two axis, each of the arms further comprising a spray nozzle mounted upon an end of each of the bent portions of the hollow bar and angled relative to the substantially straight central portion in the two axis, the angled spray nozzles pointing into different directions, wherein the pump pushes the liquid through the connection connected to that swivel head through the hollow bar of that arm, and through the angled spray nozzles of that arm, causing an ejection of the liquid from the angled spray nozzles of that arm in a plurality of streams directed at least a portion of time at an object within the cleaning chamber, and wherein the ejection of the streams from the angled spray nozzles causes a rotation of that arm and the rotatable hollow shaft upon which the hollow rotatable bar of that arm is set; and
a plurality of conveyors that carry the object in, through, and out of the cleaning chamber, the object having a plurality of surfaces, the surfaces comprising a bottom surface, a top surface, and side surfaces, wherein two of the plurality of the conveyors are separated by a gap, wherein the liquid ejected from one or more of the angled spray nozzles hits at least a portion of the bottom surface of the object when the object passes over the gap and wherein the liquid ejected from one or more of the angled spray nozzles hits at least a portion of each of the remaining ones of the plurality of surfaces of the object as the object is carried through the cleaning chamber by one or more of the plurality of conveyors.

2. An apparatus according to claim 1, further comprising:
one or more air blowers;
a drying chamber into which one or more of the conveyors carry the object upon the object exiting from the cleaning chamber, the drying chamber further comprising:
a pipe positioned above one or more of the conveyors within the drying chamber, the pipe comprising a slit on a surface of the pipe that faces the object when the object is carried through the chamber, wherein the one or more blowers are connected to the pipe and at least a portion of the air blown by the one or more blowers exits the slit and is directed at the object when the object is aligned with the slit of the pipe.

3. An apparatus according to claim 2, wherein the pipe is positioned diagonally relative to the object.

4. An apparatus according to claim 2, at least two guide rails positioned within the drying chamber, wherein the pipe is positioned between the guard rails.

5. An apparatus according to claim 2, wherein at least a portion of the liquid blown off the object by the blown air lands on a floor of the drying chamber.

6. An apparatus according to claim 2, wherein at least a portion of the liquid blown off the object by the blown air lands on a floor of the drying chamber.

7. An apparatus according to claim 2, further comprising:
a liquid collector positioned below the conveyors within the drying chamber into which at least a portion of the liquid blown off the object by the blown air lands, the collector comprising an enclosure within which the collected liquid is contained; and
a vacuum filtration unit connected to the liquid collector enclosure via a vacuum line and further connected to the water tank and adapted to draw the liquid from the liquid collector through a filtering chamber, and to pump the filtered liquid into the liquid tank.

8. An apparatus according to claim 7, further comprising:
an angled grid positioned within the enclosure and comprising a plurality of sheets positioned at an angle relative to the enclosure, wherein at least a portion of the liquid within the collector is drawn over one or more of the sheets, urging a sedimentation of particles removed by the liquid from the object onto the sheets.

9. An apparatus according to claim 8, wherein the enclosure comprises an angled floor on which the sheets are located.

10. An apparatus according to claim 2, further comprising a micro-processor electrically interfaced to at least one of the one or more pressure washers and the one or more air blowers.

11. An apparatus according to claim 10, wherein the micro-processor is programmed to control the at least one of the one or more pressure washers and the one or more air blowers to execute programmed routines.

12. An apparatus according to claim 11, wherein the routines are executed upon a receipt by the micro-processor of a user command.

13. An apparatus according to claim 1, wherein at least one of the conveyors is powered by the motor of at least one of the one or more pressure washers.

14. An apparatus according to claim 1, wherein each of the conveyors comprise a further motor, each of the further motors separate from the other further motors.

15. An apparatus according to claim 1, wherein two or more of the plurality of the conveyors comprise a shared motor.

16. An apparatus according to claim 1, wherein at least one of the plurality of the conveyors extends outside the cleaning chamber.

17. An apparatus according to claim 1, further comprising:
at least one pair of guide rails extending within the cleaning chamber and between which the object is positioned while carried by one or more of the conveyors.

18. An apparatus according to claim 1, wherein positions of the guide rails are adjustable.

19. An apparatus according to claim 1, wherein the guide rails are positioned diagonally relative to the object.

20. An apparatus according to claim 1, further comprising:
at least one portable cleaning wand connected to the pump, the wand comprising a plurality of hollow rods, a rotatable spray nozzle mounted on each end of each of the rods, the nozzle comprising a plurality of orifices through which the liquid is ejected in a plurality of streams directed at one or more objects outside the washing chamber, the ejection urging a rotation of the spray nozzles around the hollow rods.

* * * * *